United States Patent
Coatney et al.

(10) Patent No.: US 7,546,302 B1
(45) Date of Patent: Jun. 9, 2009

(54) METHOD AND SYSTEM FOR IMPROVED RESOURCE GIVEBACK

(75) Inventors: Susan M. Coatney, Cupertino, CA (US); Steven S. Watanabe, San Jose, CA (US); Stephen H. Strange, Mountain View, CA (US)

(73) Assignee: NetApp, Inc., Sunnyvale, CA (US)

( * ) Notice: Subject to any disclaimer, the term of this patent is extended or adjusted under 35 U.S.C. 154(b) by 244 days.

(21) Appl. No.: 11/606,452

(22) Filed: Nov. 30, 2006

(51) Int. Cl.
  *G06F 17/30* (2006.01)
(52) U.S. Cl. .................................................. 707/10
(58) Field of Classification Search .............. 707/9, 707/100, 200–204, 10; 370/216, 230, 240, 370/401; 711/111, 202; 709/216, 217, 228, 709/229; 714/5
  See application file for complete search history.

(56) References Cited

U.S. PATENT DOCUMENTS

| | | | |
|---|---|---|---|
| 6,205,481 B1 * | 3/2001 | Heddaya et al. | 709/226 |
| 6,449,622 B1 * | 9/2002 | LaRue et al. | 707/201 |
| 6,671,773 B2 * | 12/2003 | Kazar et al. | 711/112 |
| 7,231,489 B1 * | 6/2007 | Larson et al. | 711/111 |
| 7,260,737 B1 * | 8/2007 | Lent et al. | 714/5 |
| 2002/0174207 A1 * | 11/2002 | Battou | 709/223 |
| 2003/0120743 A1 * | 6/2003 | Coatney et al. | 709/217 |
| 2003/0126139 A1 * | 7/2003 | Lee et al. | 707/100 |
| 2004/0030668 A1 * | 2/2004 | Pawlowski et al. | 707/1 |
| 2005/0193226 A1 * | 9/2005 | Ahmed et al. | 714/4 |
| 2006/0056421 A1 * | 3/2006 | Zaki | 370/400 |
| 2006/0218210 A1 * | 9/2006 | Sarma et al. | 707/204 |

OTHER PUBLICATIONS

Brian White et al., "An Integrated Experimental Environment for Distributed Systems and Networks", Dec. 23, 2002, School of Computing, University of Utah, http://www.cs.utah.ed/flux/netbed, pp. 1-16.*
ANSI X3.230, Fibre Channel Physical and Signaling Interface (FC-PH), 430 pages.
Snively, Bob. "New Identifier Formats Based on IEEE Registration X3T11/96-467", revision 2, 5 pages, Jan. 16, 2001.

* cited by examiner

*Primary Examiner*—Diane Mizrahi
(74) *Attorney, Agent, or Firm*—Cesari and McKenna, LLP

(57) ABSTRACT

A method and system performs a sendhome procedure for giving back resources to a node that had been restored after a takeover of that node's resources is provided. Critical operations that may be running are completed prior to the sendhome process. An ownership module consults information in an ownership table about each resource, e.g. a data container. A data container, such as a root aggregate of the waiting node is identified and sent back first, after which the node is booted. When the node has been successfully booted, the remaining aggregates are sent back one at a time until the full compliment of aggregates has been returned. A veto of the sendhome procedure can be invoked by a subsystem that is performing a critical operation prior to the sendhome of the root aggregate and each individual other aggregate.

13 Claims, 15 Drawing Sheets

| CF PROTOCOL | 510 |
|---|---|
| RC | 508 |
| UDP | 506 |
| IP | 504 |
| MEDIA ACCESS | 502 |

| SVS ID 602 | INODE NUMBER 604 | UNIQUE-IFIER 606 | STRIPED FLAG 608 | STRIPING EPOCH NUMBER 610 |
|---|---|---|---|---|

| VOLUME ID | 1005 |
|---|---|
| AGGREGATE ID | 1010 |
| ⋮ | 1015 |

| AGGREGATE ID | 1105 |
|---|---|
| D-MODULE ID | 1110 |
| ⋮ | 1115 |

FIG. 11

METHOD AND SYSTEM FOR IMPROVED RESOURCE GIVEBACK

CROSS REFERENCE TO RELATED APPLICATIONS

This application is related to the following United States patent applications:

U.S. patent application Ser. No. 11/606,727, filed on even date herewith, entitled SYSTEM AND METHOD FOR STORAGE TAKEOVER by Susan M. Coatney et al., which is presently incorporated by reference herein in its entirety; and U.S. patent application Ser. No. 11/606,538, filed on even date herewith, entitled SYSTEM AND METHOD FOR MAINTAINING DISK LOCATION VIA HOMENESS, by Steven S. Watanabe, et al., which is presently incorporated by reference herein in its entirety.

BACKGROUND OF THE INVENTION

1. Field of the Invention

The present invention relates to networked storage systems and, more particularly, to failover protection in clustered storage systems.

2. Background Information

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the file server. The clients typically communicate with the filer by exchanging discrete is frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC (FCP) or TCP/IP/Ethernet (iSCSI). A SAN arrangement or deployment allows decoupling of storage from the storage system, such as an application server, and some level of storage sharing at the application server level. There are, however, environments wherein a SAN is dedicated to a single server. When used within a SAN environment, the storage system may be embodied as a storage appliance that manages access to information in terms of block addressing on disks using, e.g., a logical unit number (LUN) in accordance with one or more block-based protocols, such as FCP.

One example of a SAN arrangement, including a multi-protocol storage appliance suitable for use in the SAN, is described in United States Patent Application Publication No. US2004/0030668 A1, filed on Feb. 14, 2004, entitled MULTI-PROTOCOL STORAGE APPLIANCE THAT PROVIDES INTEGRATED SUPPORT FOR FILE AND BLOCK ACCESS PROTOCOLS by Brian Pawlowski et al.

It is advantageous for the services and data provided by a storage system, such as a storage node, to be available for access to the greatest degree possible. Accordingly, some storage systems provide a plurality of storage system nodes organized as a cluster, with a first storage system node coupled to and cooperating with a second storage system node. Each storage system node is configured to takeover serving data access requests for the other storage system node if the other node fails. The storage nodes in the cluster notify one another of continued operation using a heartbeat signal exchanged over a cluster interconnect and a cluster switching fabric. If one of the storage system nodes detects the absence of a heartbeat from the other storage node over both the cluster interconnect and the cluster switching fabric, a failure of the other node is assumed and a takeover procedure is initiated. The node failure is also usually confirmed by the surviving storage node using a mailbox mechanism of the other storage node to confirm that, in fact, a failure of the other storage node has occurred, rather than simply a failure of the cluster node coupling.

Specifically, the mailbox mechanism includes a set of procedures for determining the most up-to-date coordinating information through the use of one or more "master mailbox" disks. Such disks receive messages from the storage node with which they are associated in order to confirm that the node continues to be in communication with the disks and that the node continues to be capable of writing to other disk coupled to that node. Further details on the configuration and operation of the master mailbox disk are provided in commonly-owned U.S. patent application Ser. No. 10/378,400, of Larson et al., for a SYSTEM AND METHOD FOR COORDINATING CLUSTER STATE INFORMATION, filed on Mar. 3, 2003, which is presently incorporated by reference herein in its entirety.

In some storage system architectures, each storage node in the cluster is generally organized as a network element (N-module) and a disk element (D-module). The N-module includes functionality that enables the node to connect to clients over a computer network while each D-module connects to one or more storage devices, such as the disks. The disks are arranged as one or more aggregates containing one or more volumes. A file system architecture of this type is generally described in United States Patent Application Publication No. US 2002/0116593 entitled METHOD AND SYSTEM FOR RESPONDING TO FILE SYSTEM REQUESTS, by M. Kazar et al. (the contents of which are incorporated herein by reference in entirety).

Extensions to such architectures include the assignment of certain functionality to the D-module which may have previously been performed by the N-module. For example, the N-module is generally responsible for network connectivity, while the D-module performs functions relating to data containers and data access requests to those containers. In such configurations, it may be desirable to further configure the D-module such that it can perform a recovery procedure, including takeover and giveback operations, independent of the N-module.

Once the failed node has been either replaced or repaired in accordance with the recovery procedure, the failed node is typically brought back into service. Data containers such as disks and their associated volumes and/or aggregates, previously served by that failed node are "returned" to the now recovered node such that data access requests may once again be served by the recovered node. However, returning a full compliment of aggregates and volumes back to the recovered node has a fairly substantial processing performance impact because of the many tasks which are required to be performed during node recovery. For example, RAID assimilations for all of the aggregates are required to bring the aggregates online at once, so that they may be served by the recovered node. Yet, the aggregates are generally not available during performance of these tasks, which can result in noticeable downtime to clients, since service to data access requests is essentially disabled during the recovery procedure. Furthermore, if the recovered node does not reboot after the giveback operation, there may be additional downtime while the problem is detected and addressed.

There remains a need, therefore, for an improved method for giveback of data resources, such as aggregates, volumes and disks to a previously failed node after recovery of that node that does not have a significant adverse impact in terms of processing performance and noticeable downtime to clients.

SUMMARY OF THE INVENTION

The present invention overcomes the disadvantages of the prior art by providing an improved technique for resource give back (also referred to herein as "sendhome"). This occurs after a takeover, when the resources are being given back to a previously failed storage system node in the cluster, once that node is brought back into service. During the takeover procedure, a surviving storage system node (i.e., the takeover node) asserts ownership over the resources of the failed node and serves data access requests directed to those resources. The term "resources" as used herein includes disks, volumes, aggregates or other data containers and portions of disks, volumes, aggregates or other data containers. When the failed node has been recovered, i.e., has been repaired, replaced or otherwise brought back into service, it is placed in a "waiting for sendhome" state until its resources are re-assigned to it. Thus, this node is referred to herein as the "waiting" node.

When the takeover node receives notice that the waiting node is ready to begin servicing its resources, such as disks, a failover monitor module of the takeover node triggers a "sendhome" procedure. In accordance with the invention, the sendhome procedure first involves identifying the resources that need to be returned to the waiting node, and this is illustratively accomplished by the failover monitor module of the takeover node consulting the RAID module to inter alia, identify a root aggregate of the waiting node. The disks of the root aggregate are the first disks to be sent, and thus reassigned to the waiting node. The waiting node is thereafter booted using the root aggregate. Prior to sending the root aggregate home, one or more subsystems on the takeover node are given an opportunity to veto the sendhome if any long, non-restartable or other critical operations are in progress for the root aggregate. If such operations are in progress the subsystem performing such an operation can veto the sendhome in order to allow such processes to continue.

If the sendhome is allowed, then the disks of the root aggregate associated with the waiting node are returned in parallel until the full compliment of the disks originally assigned to the waiting node are successfully returned and the waiting node can serve data access requests on its own for the root aggregate. Once the waiting node has fully started all services on that node the other non-root aggregates are sent home by the takeover node in a similar fashion; each subsystem is given the opportunity to veto the sendhome for that particular aggregate and if no subsystem vetoes the sendhome, then the sendhome is performed. Other procedures are provided in accordance with the present invention to cover situations in which the waiting node must perform a takeover prior to all of its disks being returned during the sendhome procedure. Additionally, an illustrative procedure for an early sendhome is provided in accordance with the invention.

More specifically, the waiting node boots from compact flash and signals to the takeover node that it is ready to receive its aggregates back. The takeover node determines the root aggregate for the waiting node and then allows each subsystem to veto a sendhome. If none of the subsystems vetoes the sendhome then the root aggregate is sent back to the waiting node. The waiting node receives the root aggregate and then completely boots up by starting other subsystems, as described in further detail herein. When such subsystems are up and running the waiting node signals this fact to the takeover node. The takeover node finds remaining aggregates belonging to the waiting node and sends each one back one at a time. For each aggregate it allows each subsystem to veto the sendhome for that aggregate.

BRIEF DESCRIPTION OF THE DRAWINGS

The invention description below refers to the accompanying drawings, of which:

FIG. 5 is a schematic block diagram illustrating the format of a cluster fabric (CF) message in accordance with an illustrative embodiment of the present invention;

FIG. 6 is a schematic block diagram illustrating the format of a data container handle in accordance with an illustrative embodiment of the present invention;

FIG. 10 is a schematic block diagram of a volume location database (VLDB) volume entry in accordance with an illustrative embodiment of the present invention;

FIG. 11 is a schematic block diagram of a VLDB aggregate entry in accordance with an illustrative embodiment of the present invention;

DETAILED DESCRIPTION OF AN ILLUSTRATIVE EMBODIMENT

A. Cluster Environment

Figure 1:
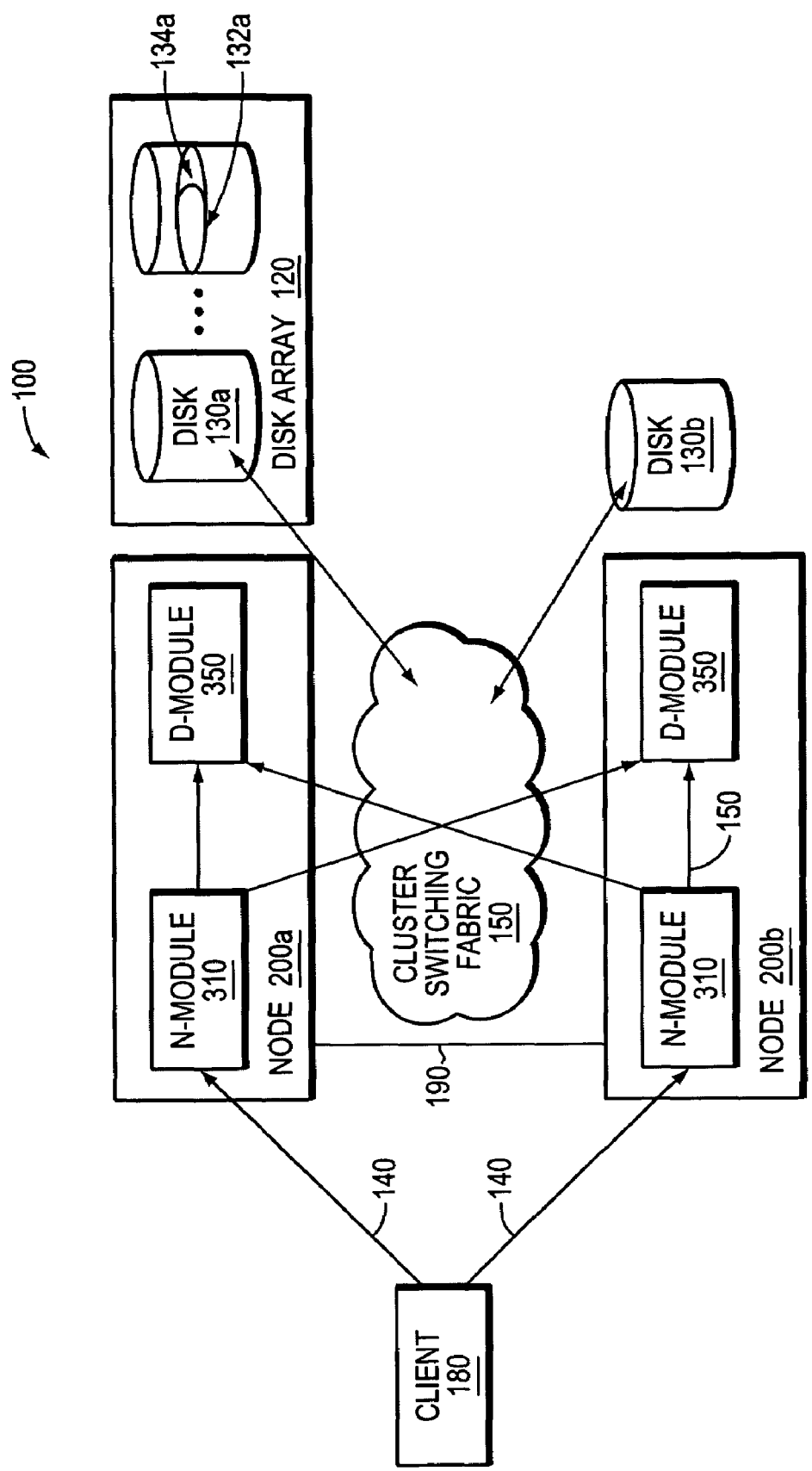
FIG. 1 is a schematic block diagram of a plurality of nodes interconnected as a cluster in accordance with an illustrative embodiment of the present invention.

FIG. 1 is a schematic block diagram of a plurality of nodes 200 a,b interconnected as a cluster 100 and configured to provide storage services relating to the organization of information on storage devices. The nodes 200 a,b comprise various functional components that cooperate to provide a distributed storage system architecture of the cluster 100. To that end, each node 200 a,b is generally organized as a network element (N-module 310) and a disk element (D-module 350). The N-module 310 includes functionality that enables the node 200a, for example, to connect to clients 180 over a computer network 140, while each D-module 350 connects to one or more storage devices, such as disks 130a. The nodes 200 a,b are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 entitled METHOD AND SYSTEM FOR RESPONDING TO FILE SYSTEM REQUESTS, by M. Kazar et al., published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 a,b comprising one N-module and one D-module should be taken as illustrative only.

The nodes 200 a,b are also coupled across a cluster interconnect 190 which provides an additional communication path between the nodes. The cluster interconnect 190 may be Fibre Channel (FC), InfiniBand or another suitable medium. The cluster interconnect 190 may be used to provide heartbeat signals ("heartbeats") between the two nodes. The heartbeats are used to monitor the active state of each node. The cluster heartbeats are also sent across the cluster switching fabric 150 over which communications between an N-module and D-module are illustratively effected through remote message passing over the cluster switching fabric 150, which is sometimes also referred to as the "storage layer." The "death" ("failure") of a node is indicated by the loss of heartbeat from both the cluster interconnect and the storage layer. The cluster interconnect is sometimes also referred to as the storage takeover interconnect because as described further hereinafter, if the heartbeat terminates (i.e., "times out"), then a takeover procedure is enabled.

The clients 180 may be general-purpose computers configured to interact with the nodes 200 a,b in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

During normal cluster operation, the node (e.g., node 200a) that is connected to a set of disks 130a is identified as the "home" of the disks 130a. That node is also identified as the "current owner" at initialization and is primarily responsible for servicing data requests directed to blocks on volumes contained on its set of the disks. Further details about this aspect of ownership of a disk are provided in the above-cited U.S. patent application Ser. No. 11/606,538, entitled SYSTEM AND METHOD FOR MAINTAINING DISK LOCATION VIA HOMENESS. For example, the node 200a is primarily responsible for the volumes of the disk array which are represented as disk 130a. Similarly, the node 200b is primarily responsible for the disks in the volumes represented as disk 130b in FIG. 1. The cluster 100 is configured such that either node 200a or 200b can take over data servicing capabilities for the other node in the event of a failure in the manner described further herein. Notably, in a multiple node cluster, a failed node's disks may not all be claimed by a single takeover node. Instead, some of the disks may be claimed by a first takeover node, with the remaining disks being claimed by a second takeover node, for example. This may be used for load balancing of I/O traffic.

B. Storage System Node

Figure 2:
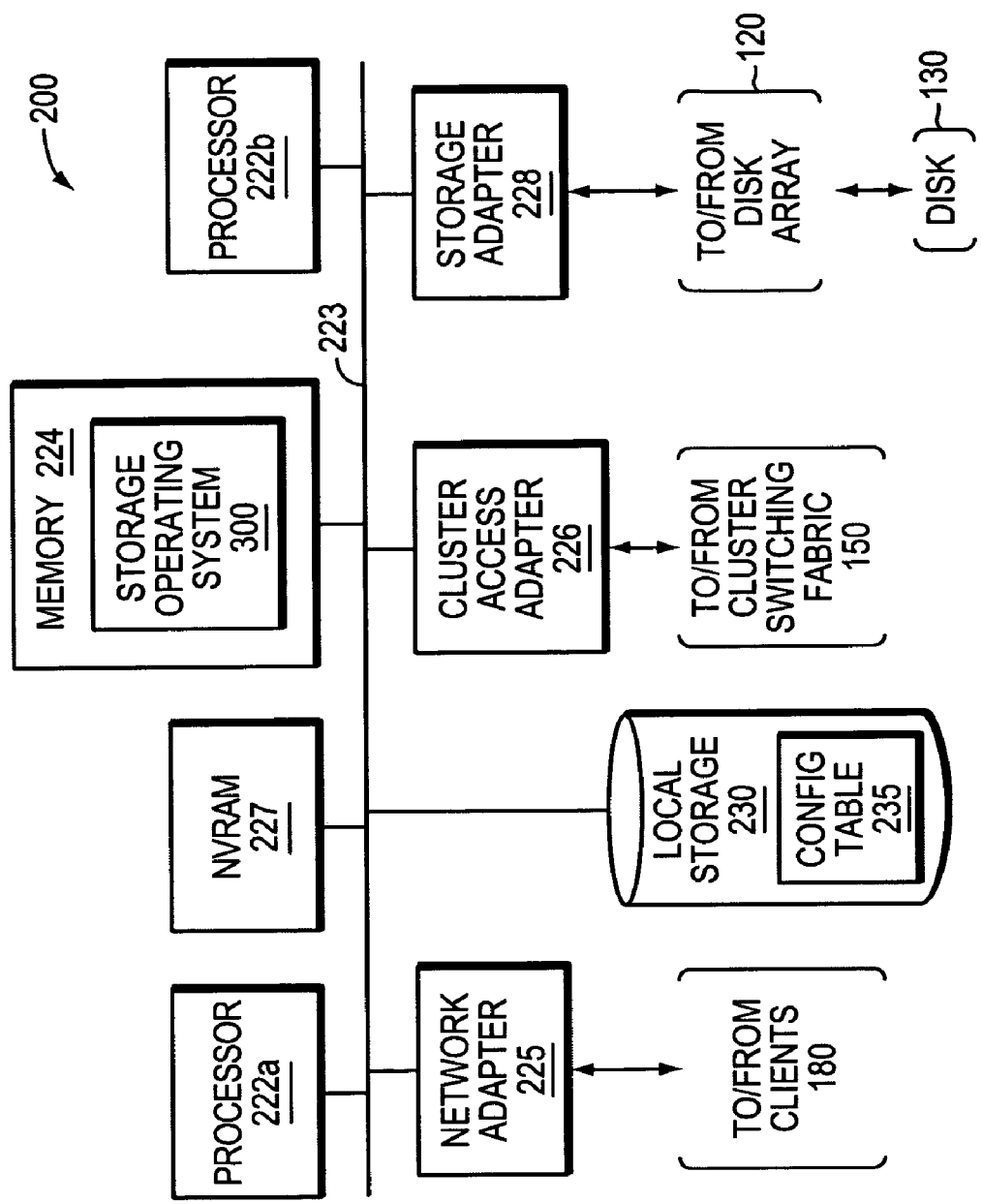
FIG. 2 is a schematic block diagram of a node in accordance an illustrative embodiment of the present invention.

FIG. 2 is a schematic block diagram of a node 200 that is illustratively embodied as a storage system comprising a plurality of processors 222 a,b, a memory 224, a network adapter 225, a cluster access adapter 226, NVRAM 227 (non-volatile random access memory), a storage adapter 228 and local storage 230 interconnected by a system bus 223. The local storage 230 comprises one or more storage devices, such as disks, which can be utilized by the storage system node to locally store configuration information (e.g., in configuration table 235) provided by one or more management processes that execute as user mode applications 900 (see FIG. 9). Alternatively, such information may be stored remotely. The cluster access adapter 226 comprises a plurality of ports adapted to couple the node 200 to other storage system nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each storage system node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the is functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 (FIG. 1) may be embodied as an Ethernet network or a FC network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130. The storage adapter comprises a plurality of ports having input/output (I/O) interface circuitry that couples to the disks over an I/O interconnect arrangement, such as a conventional high-performance, FC link topology.

Storage of information on each disk array 130 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data, once all of the disks in a given RAID group are assimilated. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named data containers such as directories and files on the disks. Each "on-disk" file may be implemented as a set of disk blocks configured to store information, such as data, whereas the directory may be implemented as a specially formatted file in which names and links to other files and directories are stored. The virtualization module(s) allow the file system to further logically organize information as a hierarchical structure of data containers such as blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
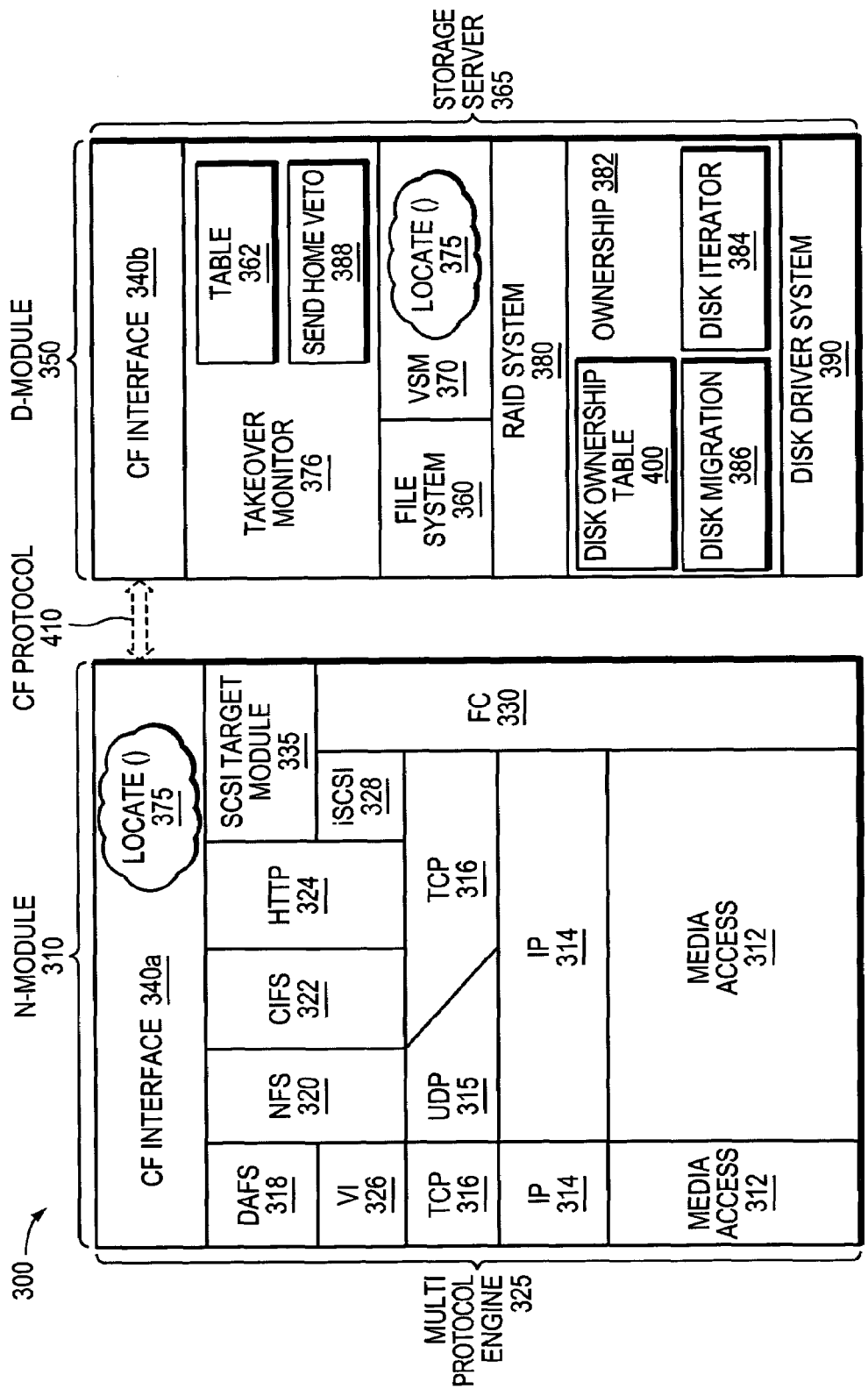
FIG. 3 is a schematic block diagram of an illustrative storage operating system that may be advantageously employed with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multiprotocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. As described further herein, the software layers of the storage server are illustratively embodied as a D-module 350. The storage server 365 illustratively comprises a file system module 360. The file system module 360 interacts in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the Small Computer System Interface (SCSI) protocol.

The VSM 370 illustratively implements a striped volume set (SVS) and, as such cooperates with the file system 360 to enable storage server 365 to service a volume of the SVS. In particular, the VSM 370 implements a Locate( ) function 375 to compute the location of data container content in the SVS volume to thereby ensure consistency of such content served by the cluster.

A disk ownership module 382 cooperates with the disk driver system 390 to identify the appropriate D-module for processing data access requests for particular volumes on the disk array 120. To that end, the ownership module consults an associated data structure illustratively implemented as a disk ownership table 400, which contains disk ownership information that is illustratively generated at boot-up time, and that is updated by various components of the storage operating system to reflect changes in ownership of disks. It should be understood that the data structure implemented as the table 400 may implemented in a configuration other than a table, in alternative embodiment of the invention. A disk iterator module 384 and a disk migration module 386 cooperate to identify ownership information in the ownership layer 382, and to change on-disk reservations and ownership information in response to a takeover procedure or a sendhome procedure.

In other words, the disk ownership module 382 includes program instructions for writing predefined ownership information at a proper location on each disk, such a sector on the disk, such as the disk platter 132a (FIG. 1) and which sector is a portion of the media identified schematically by reference character 134a in FIG. 1, referred to herein as ownership location 134a. The disk ownership module also includes program instructions for asserting and eliminating SCSI reservation tags, in response to commands received and generated by its disk iterator 384 and disk migration module 386. In a non-SCSI environment, appropriate software and/or firmware can be used to assert ownership on the disks by the disk elements.

A takeover or sendhome procedure is initiated and controlled by a takeover monitor process 376, in accordance with a set of routines stored in an associated data structure, which is illustratively implemented as the takeover monitor resource table 362, as described in further detail herein. The routines are summarized illustratively in the above-cited U.S. patent application Ser. No. 11/606,727. Prior to initiating the sendhome procedure for each aggregate, another data structure is consulted to determine if any subsystem vetoes the sendhome procedure. This data structure is illustratively implemented as the sendhome veto table 388. The table 388 sets forth the subsystems that are given veto authority over a sendhome procedure. More specifically, subsystems may be running long, non-restartable, or critical operations at the time that a sendhome is to be initiated. If a sendhome of that aggregate were to be initiated, there could be negative consequences due to the interruption of such critical operations. Thus, such subsystems are programmed to follow a sendhome veto process prior to committing to the sendhome process. Further details of this sendhome veto process are provided in the description of FIGS. 12 through 14.

Figure 4:
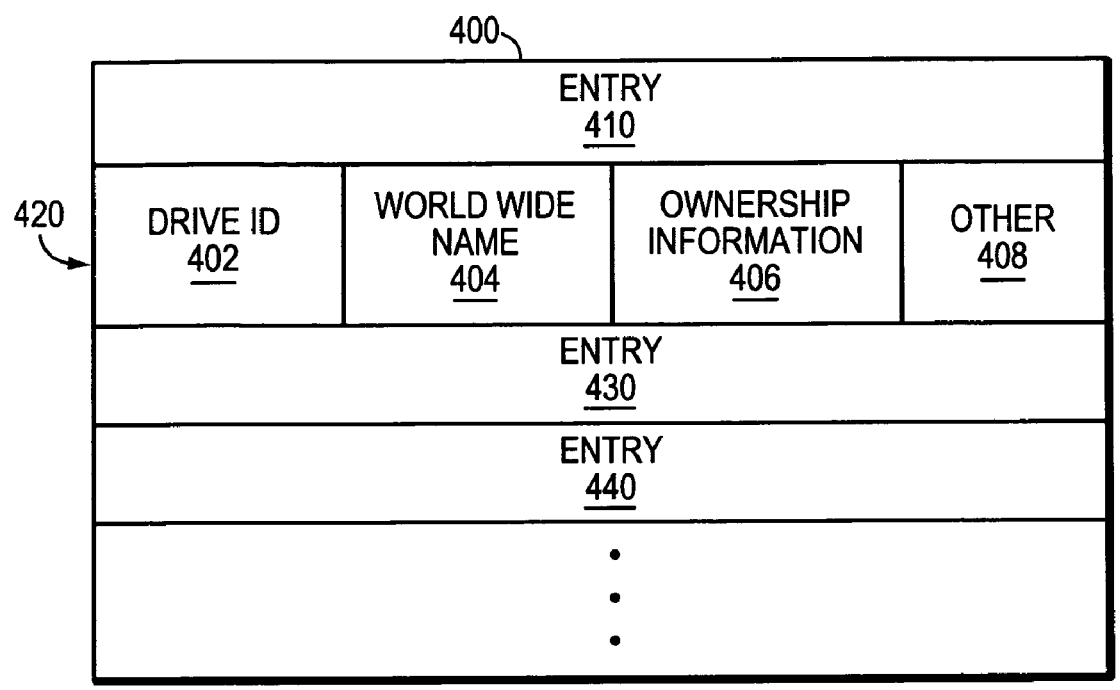
FIG. 4 is an illustrative example of a disk ownership table maintained by the ownership module of the storage operating system of the present invention.

FIG. 4 is an illustrative example of the disk ownership table 400 maintained by the ownership module 382 of the storage operating system 300. The table comprises a plurality of entries 410, 420, 430 and 440, one for each disk accessible by the appropriate D-module. The individual fields are depicted for an illustrative entry 420 including a drive identification (ID) field 402, a world wide name field 404, an ownership information field 406 and other information in a field 408. The world wide name is a 64-bit identification number which is unique for every item attached to a FC network. World wide names are described in *ANSI X3.230-1994 Fibre Channel Physical and Signaling Interface (FC-PH)* and Bob Snively, *New Identifier Formats Based on IEEE* Registration *X3T11/ 96-467, revision* 2, which are hereby incorporated by reference. The world wide name is generally loaded into disk drives during manufacturing. For file servers (such as D-module 350), the world wide name is normally generated by adding additional data bits to a file server serial number identified within the NVRAM. However, it is expressly contemplated that other means for generating a world wide name (or other appropriate standardized unique naming scheme) for file servers (and D-modules) are possible, including, but not limited to adding the manufacturer's name to a processor identification, etc.

Initially, the disk ownership table 400 is generated upon boot up of the system. More specifically, I/O services of the disk driver system 390 query all devices (e.g., disks 130) attached to the system. This query requests information as to the nature of the attached disks. Upon completion of the query, the ownership module 382 instructs the disk driver system 390 to read the ownership information from each disk. In response, the disk driver system reads the ownership information from each disk (from ownership location 134a (FIG. 1), and creates the entries in the disk ownership table 400.

Subsequently, the ownership module 382 accesses the disk ownership table 400 to extract the identification of all disks that are owned by the appropriate D-module. The ownership module then verifies the SCSI reservations on each disk owned by that D-module by reading the ownership information stored on-disk. If the SCSI reservations and ownership information do not match, the ownership module changes the SCSI reservation to match the on-disk ownership information. Once the SCSI reservations and the on-disk ownership information match for all disks identified as owned by the D-module, the ownership module 382 then passes the information to the file system and the RAID-module, which configure the individual disks into the appropriate RAID groups and volumes for the D-module 350.

Referring again to FIG. 3, the takeover monitor process 376 operates in conjunction with a cluster fabric (CF) interface module 340b to monitor the heartbeats between the node and the one or more other nodes in the cluster. If the absence of a heartbeat is detected, the takeover monitor process 376 initiates the takeover procedure. In addition, the takeover monitor is also responsive to a storage takeover command by e.g., an administrator. In response to lack of heartbeat or issuance of a storage takeover command, the takeover procedure is enabled and takeover processing begins with the takeover monitor process 376 invoking appropriate takeover routines as defined by the takeover monitor resource table 362. The takeover routines are thereafter executed in the manner described herein.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 900 (see FIG. 9), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL® file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, and a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each blade includes a CF interface module 340a,b adapted to implement intra-cluster communication among the N- and D-modules, including D-module-to-D-module communication for data container striping operations.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as source code modules within a single operating system process. Communication between an N-module and D-module is thus illustratively effected through the use of message passing between the modules although, in the case of remote communication between an N-module and D-module of different nodes, such message passing occurs over the cluster switching fabric 150. As noted, the cluster switching fabric 150 is also used as a second medium over which heartbeats between the nodes are transmitted and received. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

FIG. 5 is a schematic block diagram illustrating the format of a CF message 500 in accordance with an embodiment of the present invention. The CF message 500 is illustratively used for RPC communication over the switching fabric 150 between remote modules of the cluster 100; however, it should be understood that the term "CF message" may be used generally to refer to LPC and RPC communication between modules of the cluster. The CF message 500 includes a media access layer 502, an IP layer 504, a UDP layer 506, a reliable connection (RC) layer 508 and a CF protocol layer 510. As noted, the CF protocol is a generic file system protocol that conveys file system commands related to operations contained within client requests to access data containers stored on the cluster 100; the CF protocol layer 510 is that portion of message 500 that carries the file system commands. For example, the storage system command issued by the administrator in accordance with the invention may be sent over the CF fabric to another storage system node in the cluster, if necessary. Illustratively, the CF protocol is datagram based and, as such, involves transmission of messages or "envelopes" in a reliable manner from a source (e.g., an N-module 310) to a destination (e.g., a D-module 350). The RC layer 508 implements a reliable transport protocol that is adapted to process such envelopes in accordance with a connectionless protocol, such as UDP 506.

A data container, e.g., a file, is accessed in the file system using a data container handle. FIG. 6 is a schematic block diagram illustrating the format of a data container handle 600 including a SVS ID field 602, an inode number field 604, a unique-ifier field 606, a striped flag field 608 and a striping epoch number field 610. The SVS ID field 602 contains a global identifier (within the cluster 100) of the SVS within which the data container resides. The inode number field 604 contains an inode number of an inode (within an inode file) pertaining to the data container. The unique-ifier field 606 contains a monotonically increasing number that uniquely identifies the data container handle 600. The unique-ifier is particularly useful in the case where an inode number has been deleted, reused and reassigned to a new data container. The unique-ifier distinguishes that reused inode number in a particular data container from a potentially previous use of those fields. The striped flag field 608 is illustratively a Boolean value that identifies whether the data container is striped or not. The striping epoch number field 610 indicates the appropriate striping technique for use with this data container for embodiments where the SVS utilizes differing striping techniques for different data containers.

E. File System Organization

Figure 7:
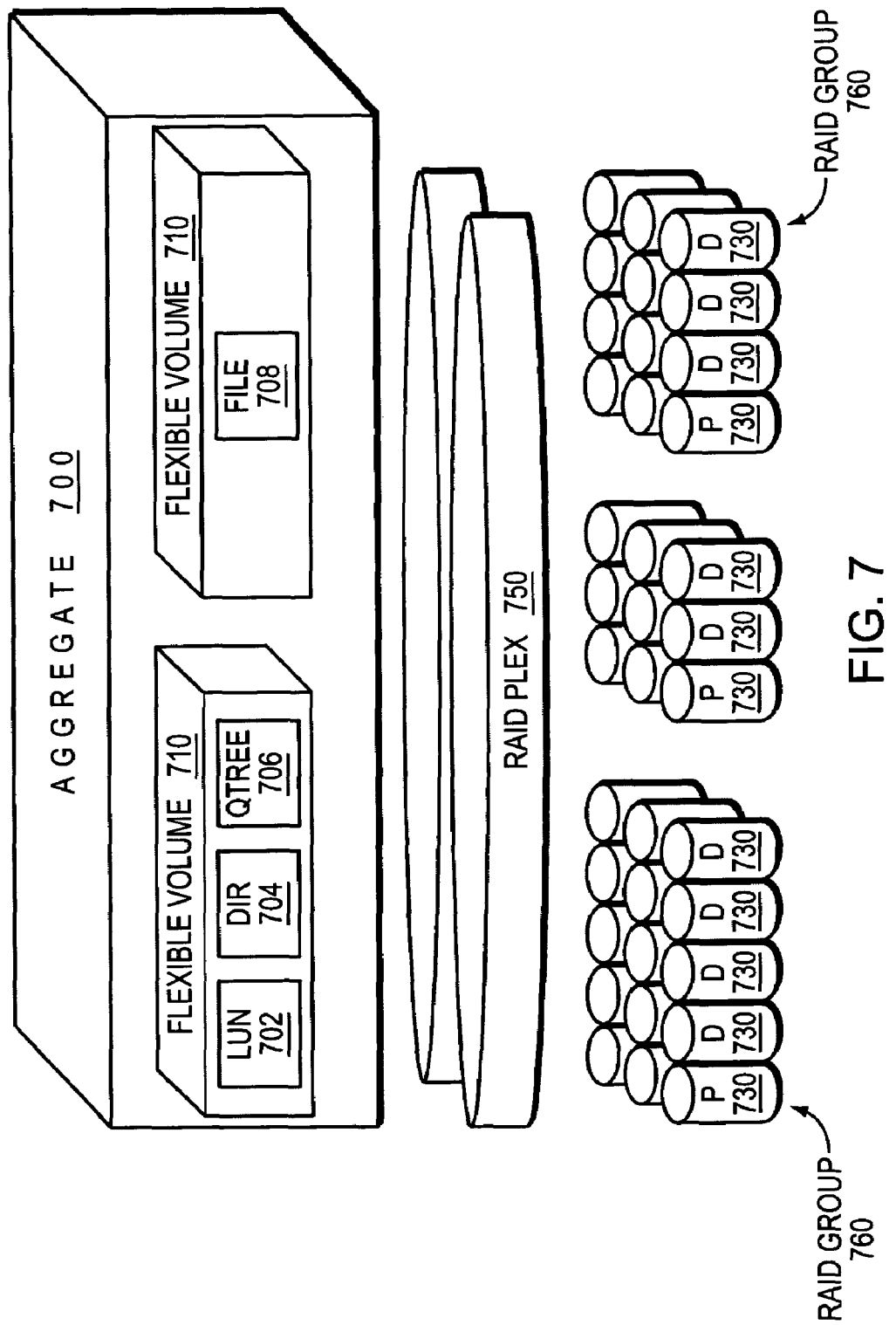
FIG. 7 is a schematic block diagram of an exemplary aggregate in accordance with an illustrative embodiment of the present invention.

FIG. 7 is a schematic block diagram of an embodiment of an aggregate 700 (which may also be a data container, such as a physical volume) that may be advantageously used with the present invention. Luns (blocks) 702, directories 704, qtrees 706 and files 708 may be contained within flexible volumes 710, such as dual vbn flexible volumes, that, in turn, are contained within the aggregate 700. The aggregate 700 is illustratively layered on top of the RAID system, which is represented by at least one RAID plex 750 (depending upon whether the storage configuration is mirrored), wherein each plex 750 comprises at least one RAID group 760. Each RAID group further comprises a plurality of disks 730, e.g., one or more data (D) disks and zero or more (P) parity disks.

Whereas the aggregate 700 is analogous to a physical volume of a conventional storage system, a flexible volume is analogous to a file within that physical volume. That is, the aggregate 700 may include one or more files, wherein each file contains a flexible volume 710 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 710 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains metadata similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 8:
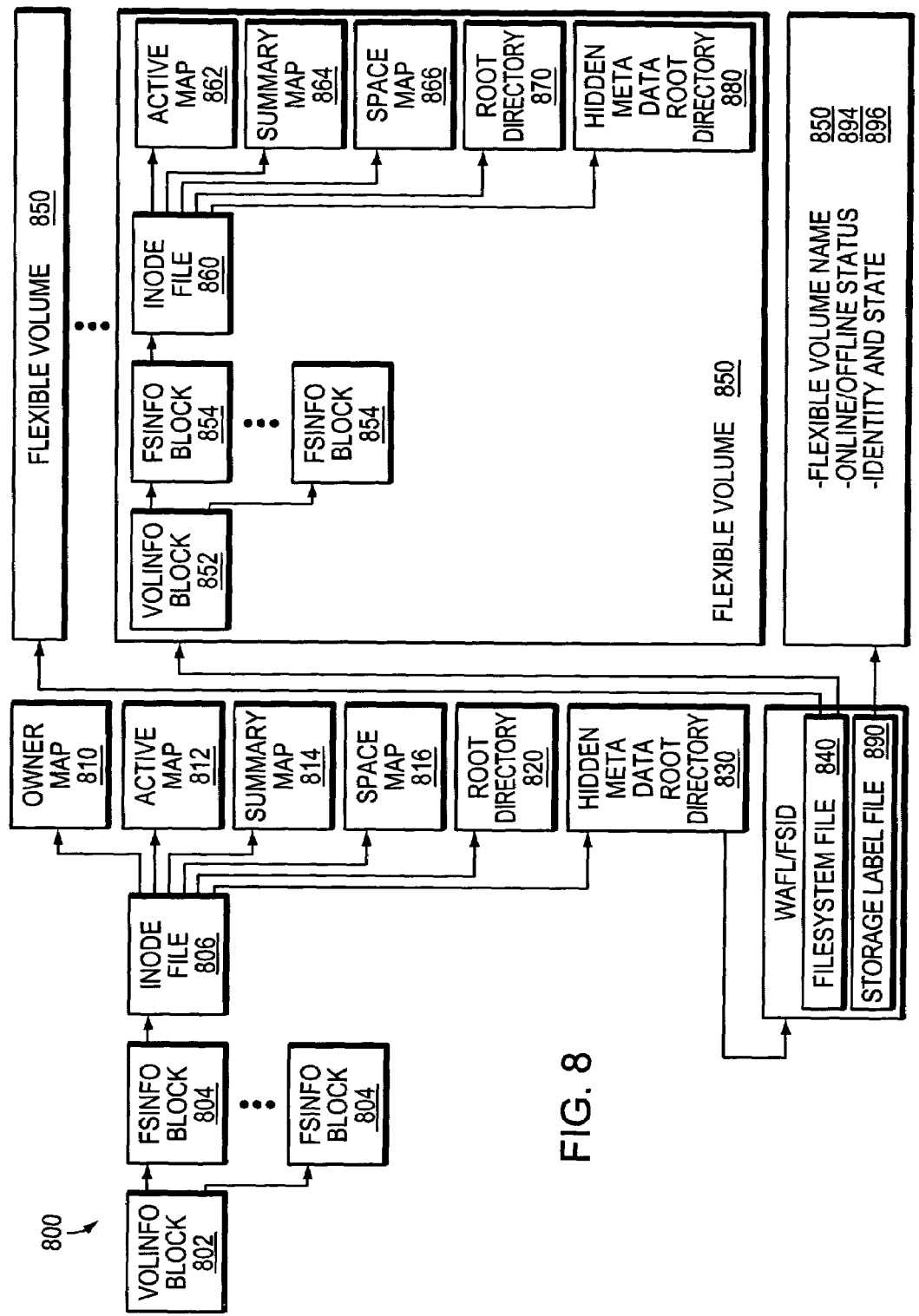
FIG. 8 is a schematic block diagram of an exemplary on-disk layout of a disk aggregate in accordance with an illustrative embodiment of the present invention.

FIG. 8 is a schematic block diagram of an exemplary on-disk layout of an aggregate 800 in accordance with an embodiment of the present invention. The storage operating system 300, e.g., the RAID system 380, assembles a physical volume of pvbns to create the aggregate 800, with pvbns 1 and 2 comprising a "physical" volinfo block 802 for the aggregate. The volinfo block 802 contains block pointers to fsinfo blocks 804, each of which may represent a snapshot of the aggregate. The fsinfo block 804 contains the fsid which is the file system identifier that indicates the snapshot number. As discussed further herein, a software program of the present invention searches for duplicate fsids among the info blocks 804 in the newly formed aggregate 800, and assigns new numbers to each fsid that is a duplication of an fsid already used in the surviving node's original aggregate.

Each fsinfo block 804 includes a block pointer to an inode file 806 that contains inodes of a plurality of files, including an owner map 810, an active map 812, a summary map 814 and a space map 816, as well as other special meta-data files. The inode file 806 further includes a root directory 820 and a "hidden" meta-data root directory 830, the latter of which includes a namespace having files related to a flexible volume in which users cannot "see" the files. The hidden meta-data root directory includes the WAFL/fsid/ directory structure that contains file system file 840 and storage label file 890. Note that root directory 820 in the aggregate is empty; all files related to the aggregate are organized within the hidden meta-data root directory 830.

In addition to being embodied as a container file having level 1 blocks organized as a container map, the filesystem file 840 includes block pointers that reference various file systems embodied as flexible volumes 850. The aggregate 800 maintains these flexible volumes 850 at special reserved inode numbers. Each flexible volume 850 also has special reserved inode numbers within its flexible volume space that are used for, among other things, the block allocation bitmap structures. As noted, the block allocation bitmap structures, e.g., active map 862, summary map 864 and space map 866, are located in each flexible volume.

Specifically, each flexible volume 850 has the same inode file structure/content as the aggregate, with the exception that there is no owner map and no WAFL/fsid/filesystem file, storage label file directory structure in a hidden meta-data root directory 880. To that end, each flexible volume 850 has a volinfo block 852 that points to one or more fsinfo blocks 854, each of which may represent a snapshot, along with the active file system of the flexible volume. Each fsinfo block, in turn, points to an inode file 860 that, as noted, has the same inode structure/content as the aggregate with the exceptions noted above. Each flexible volume 850 has its own inode file 860 and distinct inode space with corresponding inode numbers, as well as its own root (fsid) directory 870 and subdirectories of files that can be exported separately from other flexible volumes.

The storage label file 890 contained within the hidden meta-data root directory is 830 of the aggregate is a small file that functions as an analog to a conventional raid label. A raid label includes physical information about the storage system, such as the volume name; that information is loaded into the storage label file 890. Illustratively, the storage label file 890 includes the name 892 of the associated flexible volume 850, the online/offline status 894 of the flexible volume, and other identity and state information 896 of the associated flexible volume (whether it is in the process of being created or destroyed).

F. VLDB

Figure 9:
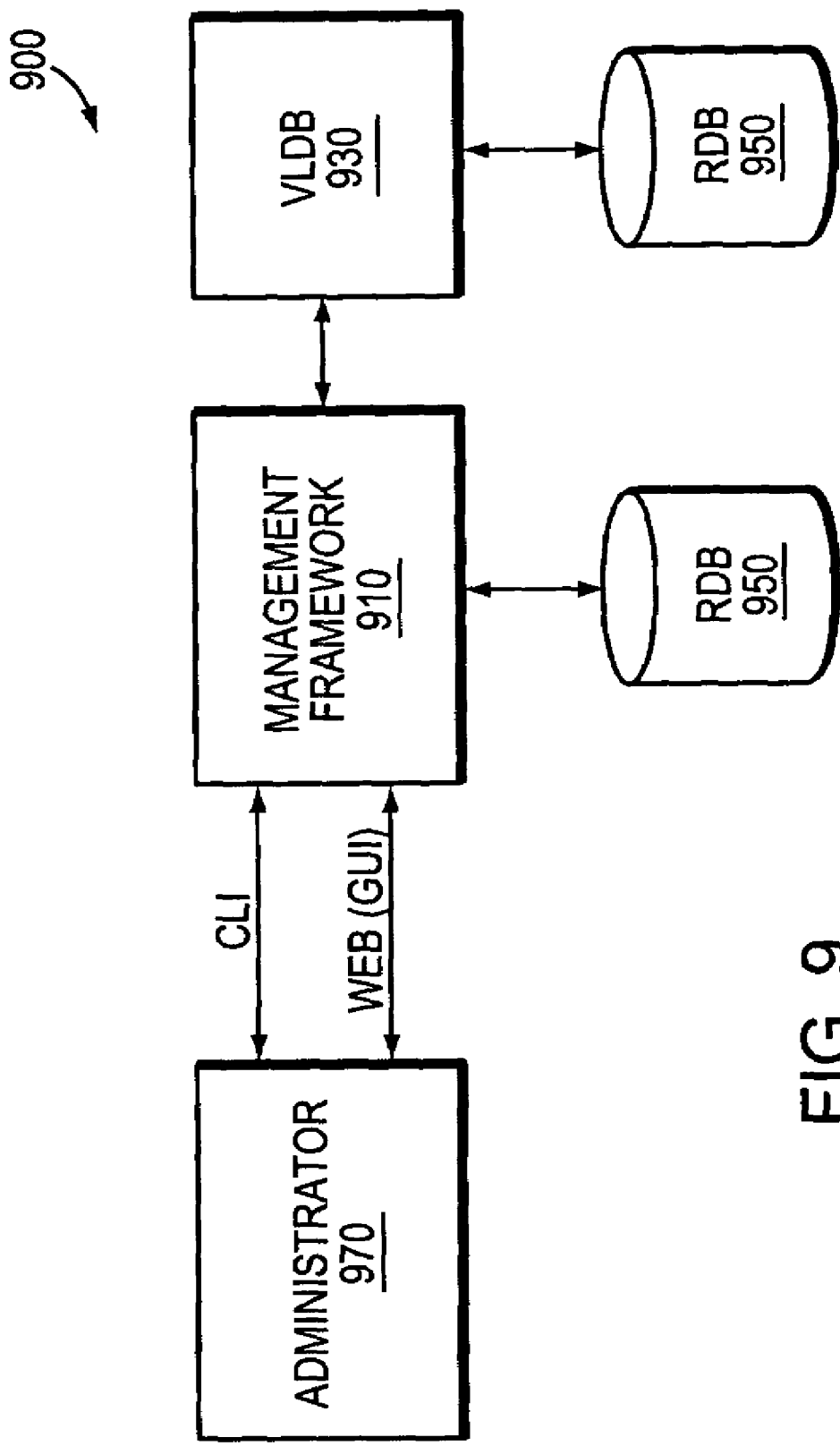
FIG. 9 is a schematic block diagram illustrating a collection of management processes in accordance with an illustrative embodiment of the present invention.

FIG. 9 is a schematic block diagram illustrating a collection of management processes that execute as user mode applications 900 on the storage operating system 300 to provide management of configuration information (i.e. management data) for the nodes of the cluster. To that end, the management processes include a management framework process 910 and a volume location database (VLDB) process 930, each utilizing a data replication service (RDB 950) linked as a library. The management framework 910 provides an administrator 970 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 930 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID 602 of a data container handle 600 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 710") and aggregates 700 within the cluster. Examples of such VLDB entries include a VLDB volume entry 1000 (FIG. 10) and a VLDB aggregate entry 1100 (FIG. 11).

FIG. 10 is a schematic block diagram of an exemplary VLDB volume entry 1000. The entry 1000 includes a volume ID field 1005, an aggregate ID field 1010 and, in alternate embodiments, additional fields 1015. The volume ID field 1005 contains an ID that identifies a volume 710 used in a volume location process. The aggregate ID field 1010 identifies the aggregate 700 containing the volume identified by the volume ID field 1005. Likewise, FIG. 11 is a schematic block diagram of an exemplary VLDB aggregate entry 1100. The entry 1100 includes an aggregate ID field 1105, a D-module ID field 1110 and, in alternate embodiments, additional fields 1115. The aggregate ID field 1105 contains an ID of a particular aggregate 700 in the cluster 100. The D-module ID field 1110 identifies the D-module hosting the particular aggregate indicated in the aggregate ID field 1105.

Notably, the VLDB illustratively implements a RPC interface, e.g., a Sun RPC interface, which allows the N-module 310 to query the VLDB 930. When encountering contents of a data container handle 600 that are not stored in its configuration table, the N-module sends an RPC to the VLDB process. In response, the VLDB 930 returns to the N-module the appropriate mapping information, including an ID of the D-module that owns the data container. The N-module caches the information in its configuration table 235 and uses the D-module ID to forward the incoming request to the appropriate data container. Thus, after a takeover or sendhome procedure in accordance with the invention, the N-module is notified of the newly assigned D-module when the VLDB 930 is updated (at the D-module ID field 1110 of the VLDB aggregate entry 1100).

The functions and interactions between the N-module 310 and D-module 350 are coordinated on a cluster-wide basis through the collection of management processes and RDB library user mode applications. To that end, the management processes have interfaces to (are closely coupled to) RDB 950 (FIG. 9). The RDB comprises a library that is provides a persistent object store (storing of objects) for the management of data processed by the management processes. Notably, the RDB 950 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Sendhome Procedure

Figure 12A:
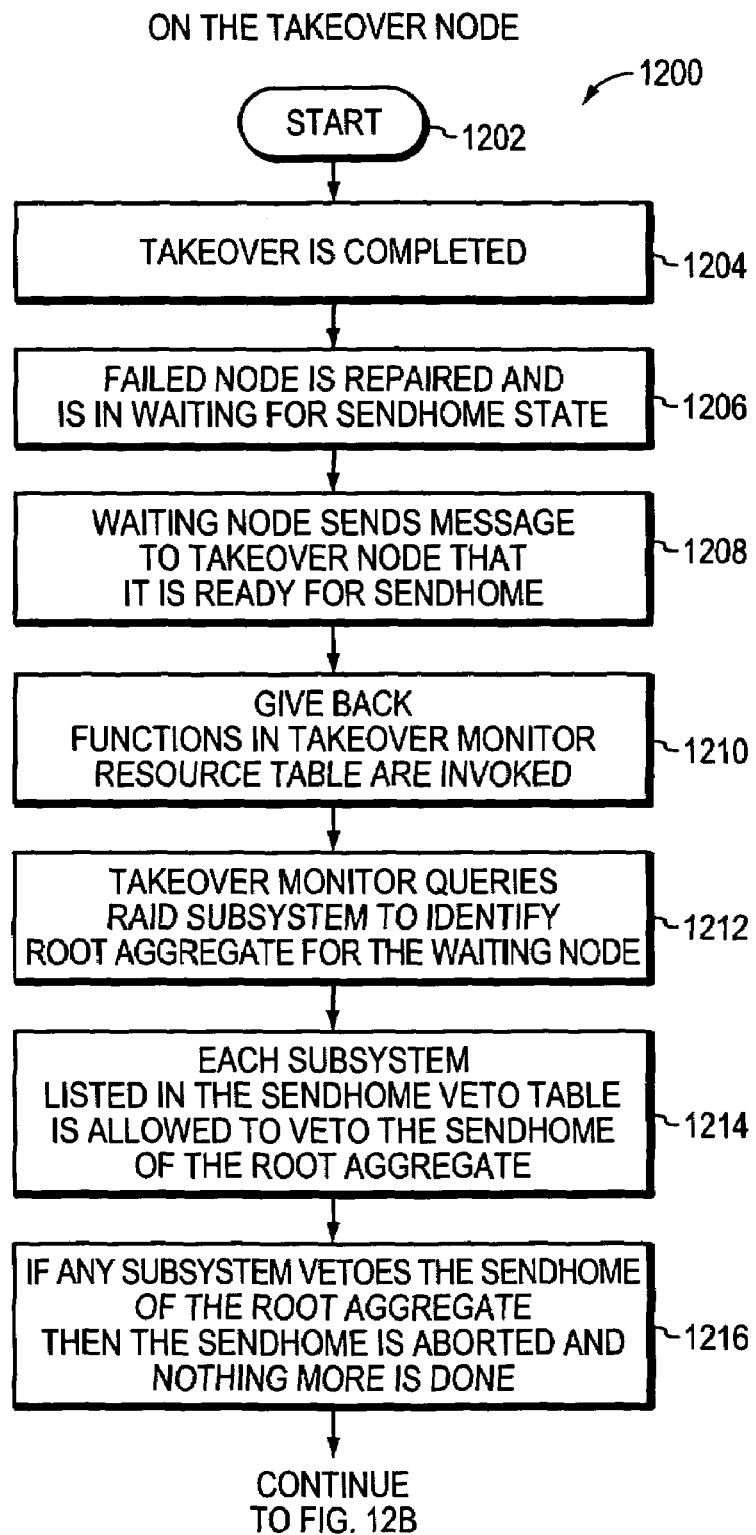
FIGS. 12A-12B together form a flow chart of a procedure for commencing sendhome operations on the takeover node, with respect to a sendhome of the root aggregate in accordance with an illustrative embodiment of the present invention.
Figure 12B:
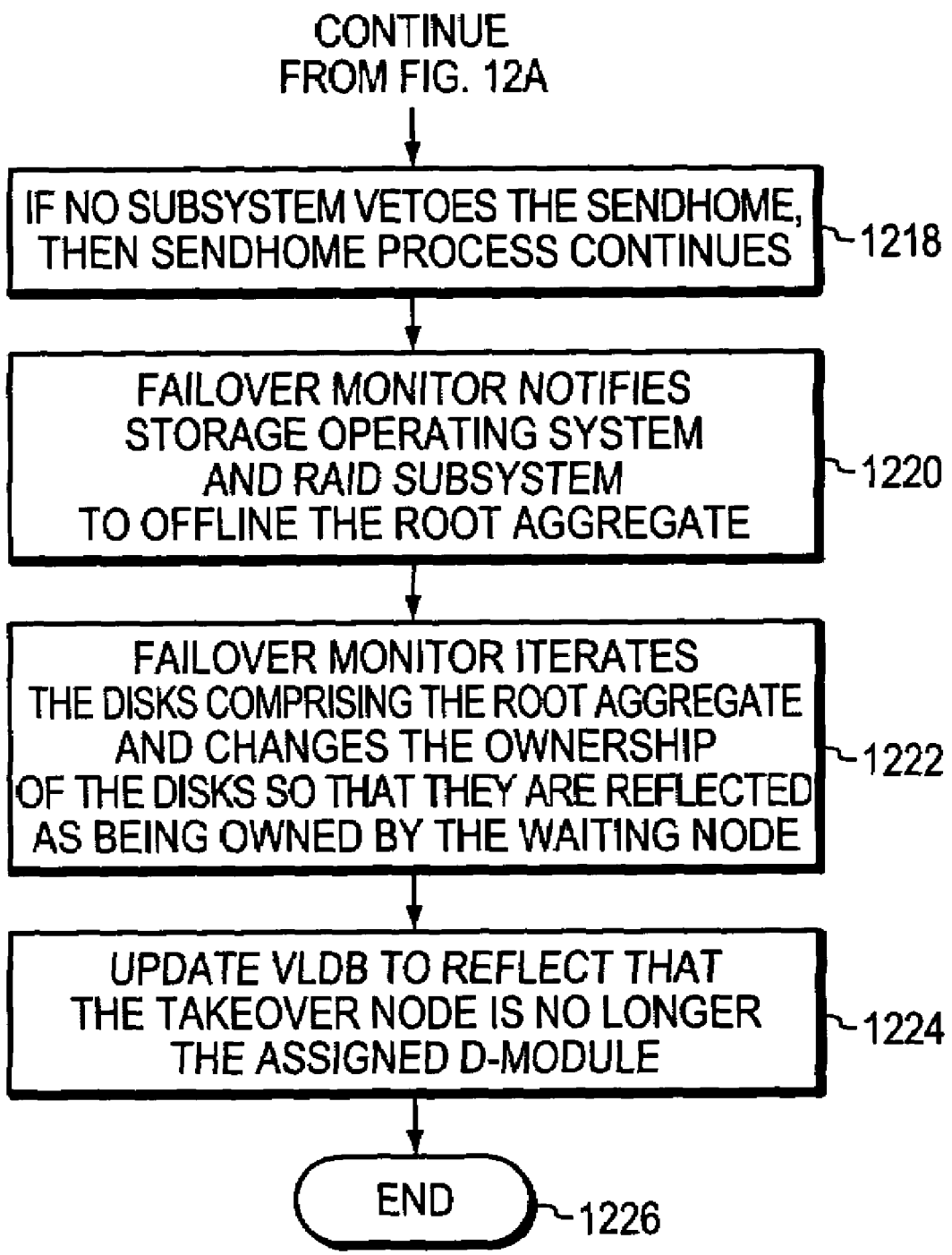

FIGS. 12A-12C together form a flow chart of a procedure for commencing sendhome operations on the takeover node, with respect to a sendhome of the root aggregate in accordance with an illustrative embodiment of the present invention. The procedure starts at step 1202 and continues to step 1204, where a takeover procedure directed to a failed node's resources. Notably, the resources may be disks as described herein, or alternatively, the invention further applies to other devices that store or transmit information related to voice, video or data communications and the like. The takeover thus initiates and completes such that the takeover node is now servicing data access requests for disks formerly serviced by the failed node. In step 1206, the failed node is either repaired, replaced or otherwise brought back into service, and as such, becomes a waiting node by transitioning to a "waiting for sendhome" state. In step 1208, the waiting node sends a message over the cluster interconnect 190 between remote modules of the cluster to indicate to the takeover node that it is ready to resume processing data access requests for its own disks. It should be noted, however, that the message may be sent over another inter-node communication infrastructure, while remaining within the scope of the present invention. Upon receipt of this message, the takeover monitor 376 of the storage server 365 intiates a give back of the resources (also referred to herein as a sendhome procedure), as shown in step 1210.

The procedure then continues to step 1212 in which the takeover monitor 376 queries the RAID subsystem to identify the root aggregate for the waiting node. In step 1214, each subsystem listed in the sendhome veto table 388 is given an opportunity to veto the sendhome for the root aggregate. A query is performed at the takeover node to determine whether any critical operations are occurring on the takeover node such that subsystems running such critical operations have a "sendhome veto." More specifically, the failover monitor calls a veto routine in each subsystem that has been programmed with a sendhome veto. This routine provides a return code notifying the failover monitor to continue or to abort. As noted, the sendhome veto is used to avoid interruption of critical operations. Such critical operations take a comparatively substantial amount of time to complete and thus it would not be efficient to interrupt such processes to begin a sendhome procedure.

If any subsystem vetoes the sendhome of the root aggregate by notifying the failover monitor using a return code for this purpose, then the sendhome is aborted and nothing more is done, as shown in step 1216. If no subsystem vetoes the sendhome of the root aggregate then continues on as in step 1218. Next, in accordance with step 1220, the failover monitor 376 notifies the storage operating system and a subsystem, such as a RAID subsystem, to offline the root aggregate. In accordance with step 1222, the failover monitor next iterates the disks comprising the root aggregate and changes the ownership of the disks so that they are indicated as being owned by the waiting node. In step 1224, the VLDB is updated to reflect that the takeover node is no longer the assigned D-module for that root aggregate.

Figure 13:
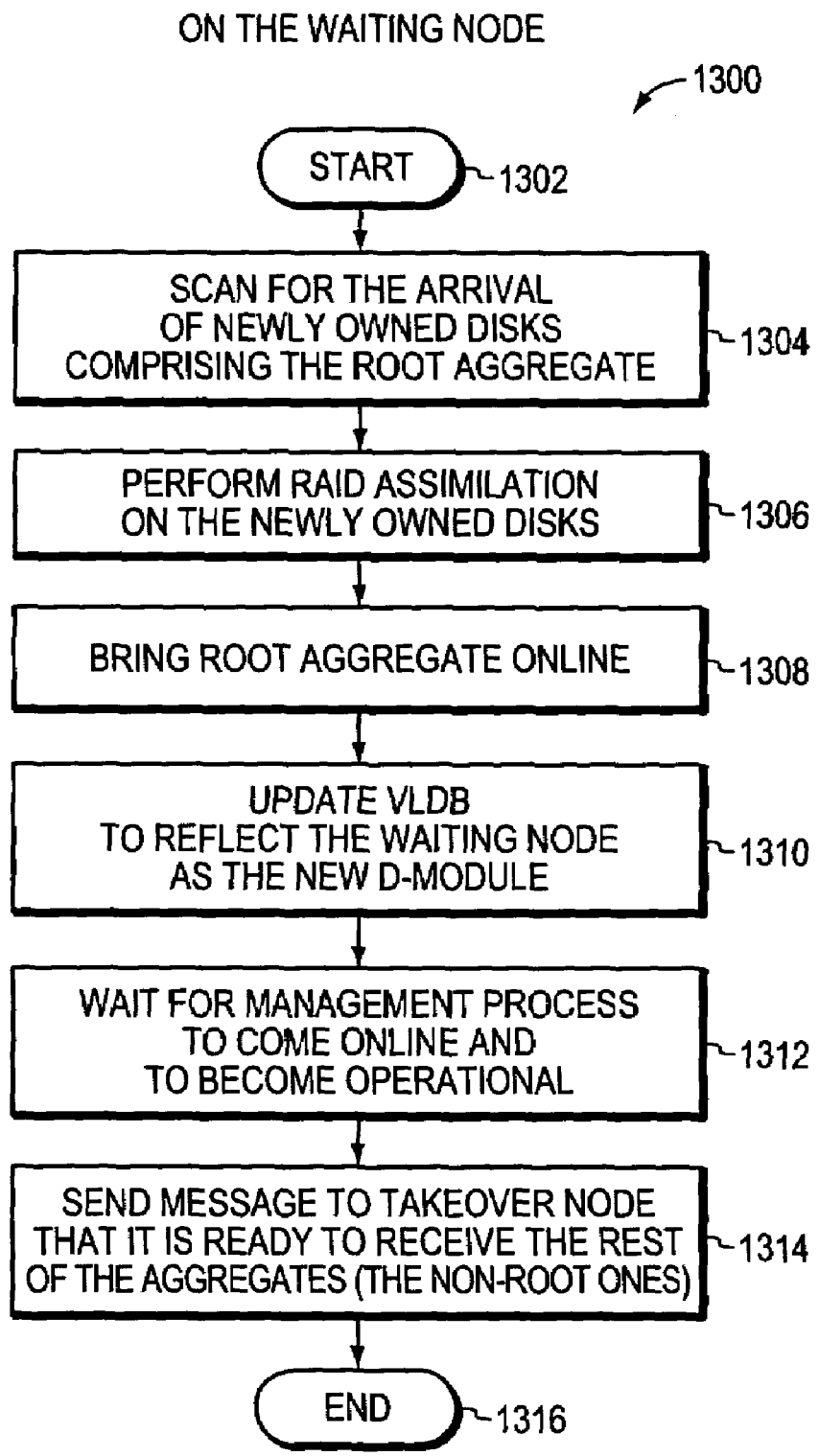
FIG. 13 is a flow chart of a procedure by which the waiting node prepares for a sendhome in accordance with an illustrative embodiment of the present invention.

FIG. 13 is a flow chart of a procedure by which the waiting node prepares for a sendhome in accordance with an illustrative embodiment of the present invention. The procedure begins at step 1302 and continues with step 1304 in which the waiting node scans for the arrival of the newly owned disks comprising the root aggregate. In step 1306, once the disks comprising the root aggregate are migrated to the waiting node, an assimilation is performed on the newly owned disks. In step 1308, the root aggregate is brought online. The VLDB is then updated to reflect the waiting node as the newly assigned D-module, which is thus the new disk element, for that root aggregate, in step 1310. The waiting node then waits for management processes 900 to come online and to become operational in step 1312. Thereafter, the waiting node sends a message to the takeover node indicating that it is ready to receive the rest of the aggregates (the non-root ones), as in step 1314.

Figure 14A:
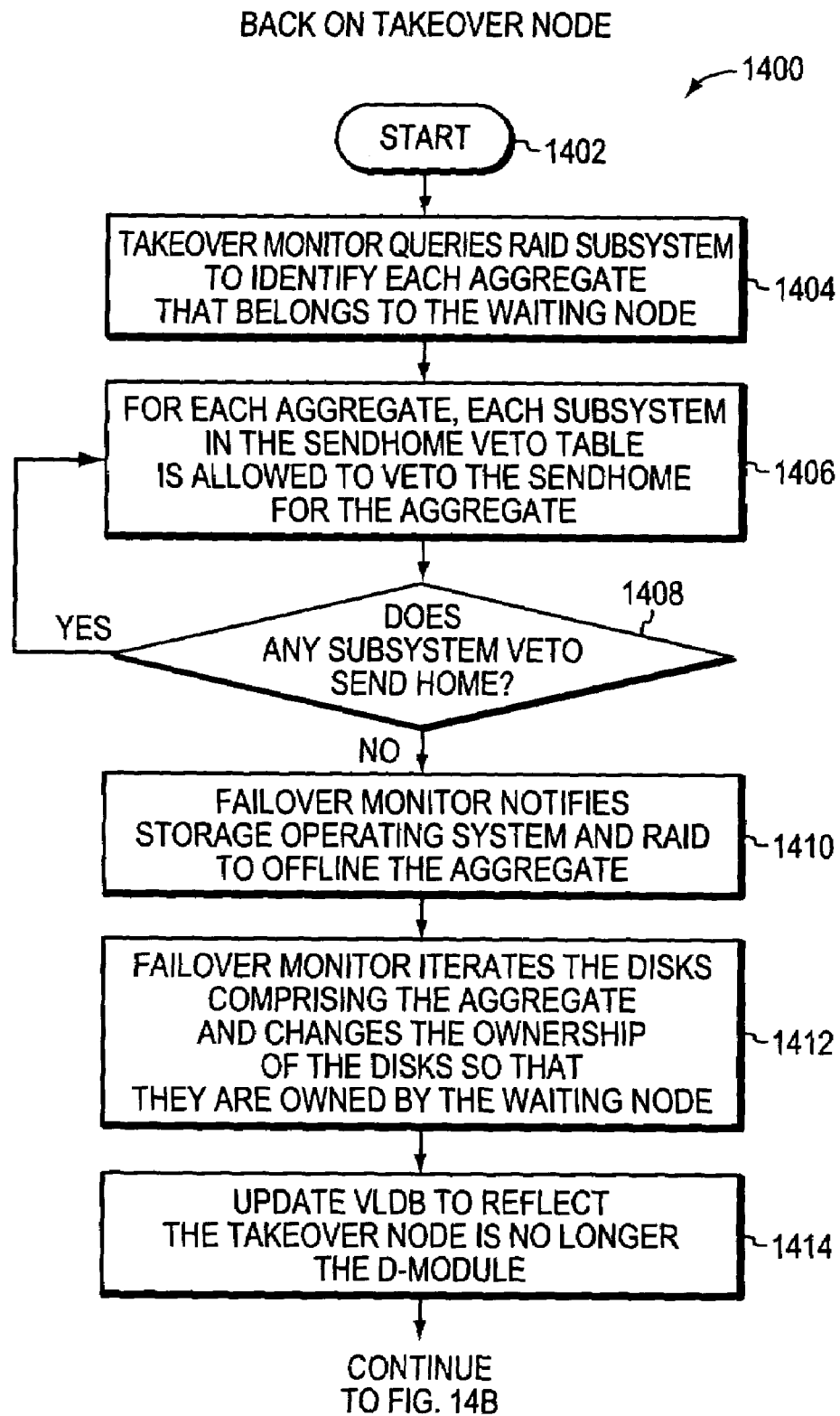
FIGS. 14A and 14B together form a flow chart of a procedure by which the takeover node allows subsystems to veto the sendhome, and in the absence of such a veto, completes the sendhome in accordance with an illustrative embodiment of the invention.
Figure 14B:
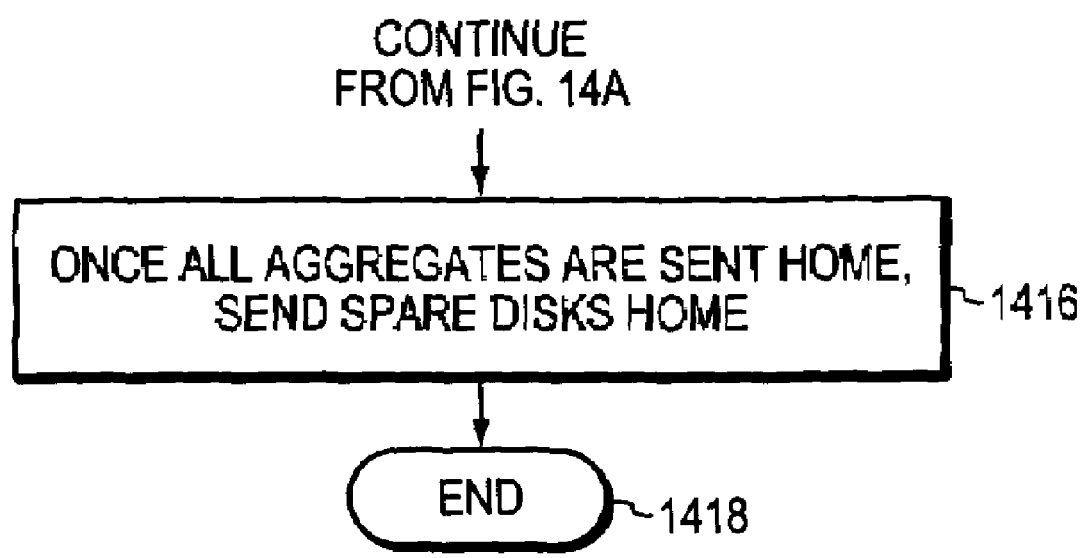

The takeover node now performs the remainder of the sendhome procedure. This aspect of the procedure is illustrated in FIGS. 14A and 14B which together form a flow chart of a procedure by which the takeover node first allows subsystems to veto the sendhome, and in the absence of such a veto, completes the sendhome in accordance with an illustrative embodiment of the invention. The procedure begins at step 1402 and continues to step 1404 in which the takeover monitor queries the RAID subsystem to identify each aggregate that belongs to the waiting node. For each such aggregate, each subsystem listed in the sendhome veto table 388 is allowed to veto the sendhome for that aggregate, e.g., because of long running operations. If any subsystem vetoes the sendhome of the aggregate (step 1408) then the sendhome of that specific aggregate is aborted but processing will continue for the remaining aggregates. Thus, for those aggregates that are not subject to a veto, the procedure continues for each such aggregate in accordance with step 1410 in which the failover monitor notifies the storage operating system and the RAID subsystem to offline the respective aggregate.

In step 1412, the failover monitor iterates the disks comprising the aggregate and changes the ownership field 406 in the ownership entry 410 in the disk ownership table 400 (FIG. 4) for each disk to reflect that they are now owned by the waiting node. In accordance with step 1414, the VLDB is updated to reflect that the takeover node is no longer the assigned D-module for that aggregate. Once all the aggregates have been sent home, then an appropriate number of spare disks are returned to the waiting node by changing the ownership of the spare disks, as desired in a particular application of the invention. It is noted that, after the aggregates are sent home to the waiting node, then in the illustrative implementation, on the takeover node the space for the returned aggregates is cleaned up.

Figure 15:
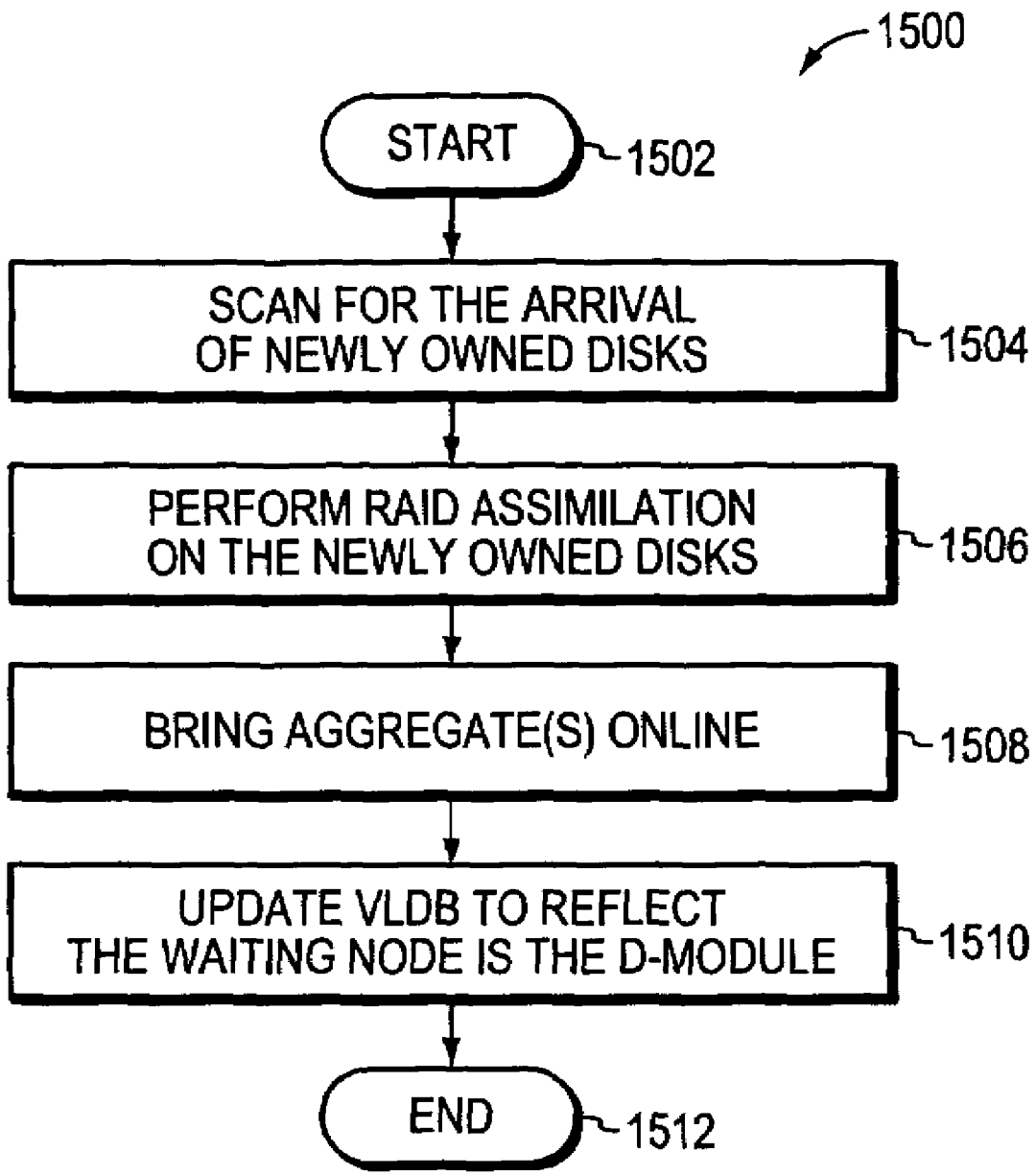
FIG. 15 is a flow chart of a procedure by which the waiting node receives the new aggregates after a sendhome is completed in accordance an illustrative embodiment of the present invention.

FIG. 15 is a flow chart of a procedure by which the waiting node receives the new aggregates after a sendhome is completed in accordance with an illustrative embodiment of the present invention. In accordance with step 1504, the waiting node scans for the arrival of newly owned disks comprising the aggregates and spare disks. In step 1506, an assimilation is performed on the newly owned disks to form new aggregates. Illustratively, this can be performed by a RAID subsystem, however, the invention may be implemented using a system other than RAID for such tasks as assimilating the disks into aggregates. These new aggregate(s) are then brought online in step 1508. In step 1510, the VLDB is updated to reflect the waiting node as the new D-module serving the new aggregates. The procedure ends at step 1512.

Now, all disks are back to being owned by the waiting node. Each N-module, interfacing with one or more clients, can begin sending data access requests to the waiting node, which is now serving its originally owned disks.

Notably, during the sendhome procedure and, while the new disks are arriving at the waiting node, a short delay of, illustratively, about 5 seconds is provided to allow sufficient time for all the disks to arrive to thereby prevent premature RAID assimilation, which could result in a degraded aggregate. In addition, it is noted that, if the root aggregate cannot be formed or located, then the waiting node will remain in its "waiting for sendhome" state.

In a multiple node cluster, a failed node's disks may not all be claimed by a single takeover node. Instead, some of the disks may be claimed by a first takeover node, with the remaining disks being claimed by a second takeover node, for example. This may be used for load balancing of I/O traffic. In such a case, each takeover node will perform its own sendhome procedure in accordance with the flow charts herein described to return the resources to the waiting node. There may be other instances in which an administrator decides not to return all resources to the waiting node, but instead returns less than it originally served, and this may be done for load balancing or other reasons in a particular application of the invention.

As noted, the procedures to be followed to determine whether a sendhome veto is to be invoked are set forth in the sendhome veto table 388 running on each D-module. An appropriate API is utilized to communicate between layers of the operating system 300 to notify the various subsystems of the sendhome process and the sendhome veto process.

Illustratively, the performance of takeover and sendhome procedures is reported via a message from the file system of the node performing the procedure to a central administrator. Thus, to the extent that takeover or sendhome fails to complete, the administrator can issue commands to ensure another D-module to service these unassigned disks.

Advantageously, the present invention reduces processing impact through an improved method for returning or sending home resources, such as aggregates, volumes, files and disks to a previously failed node after recovery of that node. In addition, the technique of sending aggregates back one at a time allows greater access to more of the aggregates for clients and reduces downtime for files, volumes and aggregates associated with the nodes involved in the novel procedure.

The foregoing description has been directed to particular embodiments of the invention. It will be apparent, however, that other variations and modifications may be made to the described embodiments with the attainment of some or all of their advantages. Specifically, it should be noted that the principles of the invention may be implemented in a non-distributed file system. Furthermore, while this description has been written in terms of D and N-modules, the teachings of the present invention are equally suitable to systems in which the functionality of the N and D-modules are implemented in a single system. Alternatively, the functions of the N and D-modules may be distributed among a number of separate systems, wherein each system performs one or more functions. Additionally, the features of the present invention have been described with respect to a cluster containing two nodes; however, it is equally applicable to clusters including a plurality of nodes, which allow for an n-way failover. Furthermore, the procedures, processes and/or modules described herein may be implemented in hardware, software, embodied as a computer readable medium having program instructions, for one or a combination thereof. Therefore, it is the object of the appended claims to cover all such variations and modifications as come within the true spirit and scope of the invention.

What is claimed is:

1. A method for performing a sendhome process for give back of resources to a waiting node that has been restored after a takeover of those resources, comprising:

identifying by a processor at least one resource previously associated with the waiting node prior to the takeover by consulting an ownership table in an ownership module on at least one node performing the takeover to find at least one ownership attribute about each resource;

identifying first a resource that is a root aggregate of the waiting node; reassigning by the processor said root aggregate to said waiting node; determining whether any subsystem on the takeover node vetoes the resource give back;

updating a volume location data base entry for each resource sent back to the waiting node to indicate the waiting node as a disk element currently responsible for data access requests directed to data on that resource;

sending the at least one resource to said waiting node; and rebooting the waiting node prior to sending any other resources back to said waiting node.

2. The method as defined in claim 1 wherein said resources are aggregates and comprising the further step of sending aggregates back to said waiting node one at a time.

3. The method as defined in claim 2 further comprising:
after a full set of the aggregates are sent back to the waiting node, performing an assimilation on the full set of aggregates for the waiting node.

4. The method as defined in claim 1 further comprising:
assigning a predetermined location on each resource as an ownership location, and identifying in said ownership location as one of said ownership attributes for each resource, a disk element which is a current owner of that resource, the disk element being currently responsible for data access requests directed to data on that resource.

5. The method as defined in claim 4 further comprising:
upon a sendhome process, writing said waiting node as the current owner in the ownership location of each resource of said resources sent back to said waiting node.

6. The method as defined in claim 4 wherein said disk element is a D-module.

7. The method as defined in claim 4 wherein said resource is a disk and said predetermined location is a sector on said disk.

8. The method as defined in claim 1 wherein said resources are disks.

9. The method as defined in claim 1 further comprising:
continuing operations on said takeover node subsystems when said sendhome has been vetoed.

10. A system configured to perform a procedure for giving back resources to a node that has been restored after a takeover of that node's resources, comprising:
a plurality of nodes connected as a cluster, with each node in said cluster being assigned one or more resources;
a file system implemented on a processor in each node that includes an ownership module that configures a table with one or more ownership attributes for each resource associated with that node;
a failover monitor configured to identify a node that is a waiting node, said failover monitor including a set of instructions for sending resources back to a waiting node after a takeover, said set of instructions including consulting said ownership module for ownership attributes of data containers associated with the system; and
a subsystem that is configured to identify a root aggregate of a waiting node and sending this information to said ownership module such that the root aggregate is sent home to the waiting node first.

11. The system as defined in claim 10 wherein said ownership module further comprises:
a disk iterator module that is configured to locate the ownership attribute information for each resource.

12. The system as defined in claim 10 wherein said ownership module further comprises:
a disk migration module that is configured to migrate resources back to a waiting node one at a time after said root aggregate is sent home to said waiting node and said waiting node is booted successfully.

13. The system as defined in claim 10 further comprising:
a sendhome veto table including a set of routines containing program instructions for aborting a sendhome or for allowing a sendhome depending upon operations then being performed by subsystems running on the takeover node.

* * * * *